(12) United States Patent
Mishra

(10) Patent No.: US 11,182,417 B1
(45) Date of Patent: Nov. 23, 2021

(54) METHOD AND SYSTEM FOR FACILITATING CONVERSION OF CONTENT BASED ON USER PREFERENCES

(71) Applicant: Anilkumar Krishnakumar Mishra, Fremont, CA (US)

(72) Inventor: Anilkumar Krishnakumar Mishra, Fremont, CA (US)

( * ) Notice: Subject to any disclaimer, the term of this patent is extended or adjusted under 35 U.S.C. 154(b) by 495 days.

(21) Appl. No.: 15/842,719

(22) Filed: Dec. 14, 2017

(51) Int. Cl.
*G06F 16/30* (2019.01)
*G06F 16/43* (2019.01)
*G06F 16/438* (2019.01)
*G06N 5/02* (2006.01)

(52) U.S. Cl.
CPC ............ *G06F 16/43* (2019.01); *G06F 16/438* (2019.01); *G06N 5/02* (2013.01)

(58) Field of Classification Search
CPC ................................ G06F 16/43; G06F 16/438
USPC ........ 707/609, 689, 705, 769, 790, 813, 821
See application file for complete search history.

(56) References Cited

U.S. PATENT DOCUMENTS

| | | | |
|---|---|---|---|
| 8,019,773 B2 | 9/2011 | Kobayashi et al. | |
| 8,073,866 B2 | 12/2011 | Eagle et al. | |
| 8,806,326 B1 | 8/2014 | Lippinen | |
| 8,825,576 B2 | 9/2014 | Aravamudan et al. | |
| 9,569,541 B2 | 2/2017 | Andersen et al. | |
| 2003/0159145 A1 | 8/2003 | Kaltz | |
| 2015/0287043 A1* | 10/2015 | Michaelis | G06Q 10/10 705/317 |
| 2015/0309768 A1 | 10/2015 | Van Der Heide | |
| 2016/0036962 A1* | 2/2016 | Rand | H04W 76/25 455/418 |
| 2016/0065637 A1* | 3/2016 | O'Malley | H04L 67/22 709/231 |
| 2018/0203851 A1* | 7/2018 | Wu | G06N 3/006 |

\* cited by examiner

*Primary Examiner* — Sana A Al-Hashemi
(74) *Attorney, Agent, or Firm* — Kanika Radhakrishnan; Evergreen Valley Law Group

(57) ABSTRACT

A method and system for facilitating content conversion is disclosed. A user request generated from a user device of a user to facilitate at least one output content based on one or more user preferences is received. At least one input content is received from at least one content source based on the one or more user preferences. Thereafter, the at least one output content is generated from the at least one input content based on one or more content characteristics. The one or more content characteristics are accessed from a plurality of content based library files for conversion of the at least one input content into the at least one output content. The at least one output content is facilitated on a content output device.

22 Claims, 5 Drawing Sheets

METHOD AND SYSTEM FOR FACILITATING CONVERSION OF CONTENT BASED ON USER PREFERENCES

TECHNICAL FIELD

The present disclosure generally relates to digital content and, more particularly, to a method and system for facilitating conversion of content such as multimedia content based on user preferences.

BACKGROUND

Generally, multimedia data includes a combination of audio, video and text (hereinafter collectively referred to as content). Content alteration/content substitution (hereinafter referred to as content conversion) of multimedia data provides new opportunities and benefits in connection with the distribution of various derivative versions of an original work. For example, using content conversion technology, a person visiting a library may be enabled to read or hear a book in any other language than the one of his/her native language. As another example, a person may be enabled to watch his/her favourite celebrity or celebrities performing a song composed by the person himself/herself using the content conversion technology. As another example, in a song, voice(s) of singer(s) can be substituted in part or full by voice(s) of another singer(s). Additionally or alternatively, sound of musical instrument(s) can be substituted in part or full by sound of another musical instrument(s). Currently available approaches for content conversion have limitations of providing single ended conversions and isolation of the content up to only a certain extent.

Therefore, enhancing, extending, correcting, investigating, reproducing, substituting and converting content based on user preferences by using electronic tools and methods would facilitate many more opportunities for social interactions and learning capabilities of human beings.

SUMMARY

Various embodiments of the present disclosure provide method, system and device for facilitating content conversion.

In an embodiment, a method includes receiving, by a system, a user request generated from a user device of a user to facilitate at least one output content based on one or more user preferences. The method further includes receiving, by the system, at least one input content from at least one content source based on the one or more user preferences. Thereafter, the method includes generating, by the system, the at least one output content from the at least one input content based on one or more content characteristics. The one or more content characteristics are accessed from a plurality of content based library files for conversion of the at least one input content into the at least one output content. Furthermore, the method includes facilitating, by the system, the at least one output content on a content output device.

In another embodiment, a system includes acommunication interface in operative communication with a processor. The communication interface is configured to receive a user request generated from a user device of a user to facilitate at least one output content based on one or more user preferences. The communication interface is further configured to receive at least one input content from at least one content source based on the one or more user preferences. The processor is configured to generate the at least one output content from the at least one input content based on one or more content characteristics. The one or more content characteristics are accessed from a plurality of content based library files for conversion of the at least one input content into the at least one output content. The processor is further configured to facilitate the at least one output content on a content output device via the communication interface.

In another embodiment, a content converter device includes an input module configured to receive a user request to facilitate at least one output content based on one or more user preferences. The content converter device also includes at least one content source configured to provide at least one input content based on the one or more user preferences. Further, the content converter device includes a processing module configured to generate the at least one output content from the at least one input content based on one or more content characteristics. The one or more content characteristics are accessed from a plurality of content based library files for conversion of the at least one input content into the at least one output content. Furthermore, the content converter device includes an output module configured to facilitate the at least one output content.

BRIEF DESCRIPTION OF THE FIGURES

For a more complete understanding of example embodiments of the present technology, reference is now made to the following descriptions taken in connection with the accompanying drawings in which.

Figure 1:
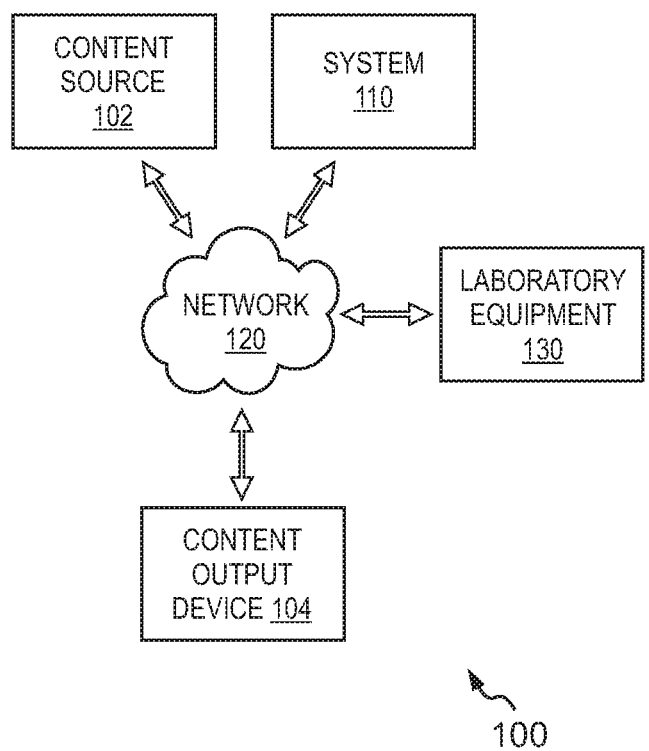
FIG. 1 illustrates an example representation of an environment related to at least some embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Various embodiments disclosed herein provide methods, systems and devices for facilitating content conversion. More specifically, a system/a content converter device is configured to receive input content from a variety of content sources. For example, the input content include audio input, text input, video input and a combination thereof (i.e., multimedia input). The system is configured to convert the input content to output content as per one or more user preferences. To achieve this, the system is configured to include a plurality of content based library files such as audio library files, video library files, text library files, language conversion library files and the like. The library files are generated using a laboratory equipment (e. g., an artificial intelligent device). Each library file further includes one or more respective content characteristics. For example, the audio library files include one or more audio characteristics and so on. The one or more content characteristics are utilized by the system to convert the input content to the output content. The output content includes audio output, text output, video output and combination thereof (i.e., multimedia output). Further, the system is configured to facilitate the output content on one or more content output devices including a user device. Various embodiments of the disclosure for facilitating content conversion are explained in detail herein with reference to FIGS. 1 to 5.

FIG. 1 illustrates an example environment 100 related to at least some embodiments of the present invention. It should be understood that the environment 100, illustrated and hereinafter described, is merely illustrative of an arrangement for describing some example embodiments, and therefore, should not be taken to limit the scope of the embodiments. As such, it should be noted that at least some of the components described below in connection with the environment 100 may be optional and thus in some example embodiments may include more, less or different components than those described in connection with the example embodiment of FIG. 1 or with subsequent FIGS. 2 to 5.

The environment 100 depicts a content source 102, a content output device 104 and a system 110 connected by a communication network such as a network 120. The content source 102 is an example of one or more electronic devices capable of providing at least one input content. Examples of input content include audio input, text input, video input and/or multimedia input. Some non-exhaustive examples of the content source 102 include a microphone, a Musical Instrument Digital Interface (MIDI), a media player, a digital camera, a camcorder, an image scanner, character scanner, a mobile phone, a webcam, a fingerprint scanner, a mechanical or touch keyboard, a touch screen, a digital pen, a stylus and the like. The content output device 104 is an example of one or more electronic devices capable of providing at least one output content to a user. Examples of output content include audio output, text output, video output and/or multimedia output. Some non-exhaustive examples of the content output device 104 include a printer, headphones, a speaker, a monitor, a mobile phone, a playback device, a projector, a tablet computer, a laptop, a mobile computer, a personal digital assistant (PDA), a mobile television, and the like.

In an example embodiment, the system 110 may correspond to a server system remotely located (e.g., in a cloud platform or otherwise) and capable of being accessed over the network 120. The system 110 may be a single composite server, or it may have multiple sub-systems. In some embodiments, the system 110 may be a physical computer or one or more cluster of computers. In other embodiments, it may be virtualized server running on one or more physical computers under the control of a virtual machine provider. In another embodiment, the system 110 may be allocated according to processor cycles and storage requirements rather than according to the number of computers. The network 120 may be a centralized network or may include a plurality of sub-networks that may offer a direct or indirect communication between the system 110, the content source 102 and the content output device 104. For example, the network 120 may include wired networks, wireless networks and combinations thereof. Some non-limiting examples of the wired networks may include Ethernet, local area networks (LANs), fiber-optic networks, and the like. Some non-limiting examples of the wireless networks may include cellular networks like GSM/3G/4G/5G/LTE/CDMA networks, wireless LANs, Bluetooth, Wi-Fi or ZigBee networks, and the like. An example of the combination of wired and wireless networks may include the Internet.

In one embodiment, a user may be presented with one or more UIs (not shown) displayed on a display screen of the user device (not shown) to send a user request to the system 110 for facilitating at least one output content. The user may also be enabled to provide one or more user preferences according to which the output content is desired to be received from the system 110. The user preferences and the request for the output content are received by the system 110 over the network 120. For example, the user may wish to convert his/her emails to audio emails when user is unable to read them in scenarios such as while driving. Further, He/she may wish to reply to emails with speech and want it to be delivered as document or speech or both at the receiving end. As another example, the user may wish to have a written document of the cooking instructions being given to the user, while cooking.

In at least one example embodiment, upon receiving the user preferences and the user request to receive the output content, the system 110 is configured to utilize one or more relevant content characteristics from the plurality of content based library files stored therein to facilitate the conversion of the input content to the output content. To achieve this, the system may communicate with/include a laboratory equipment 130 that produces the content based library files. The various embodiments of the present disclosure, capable of facilitating content conversion, are explained hereinafter with reference to FIGS. 2-5.

Figure 2:
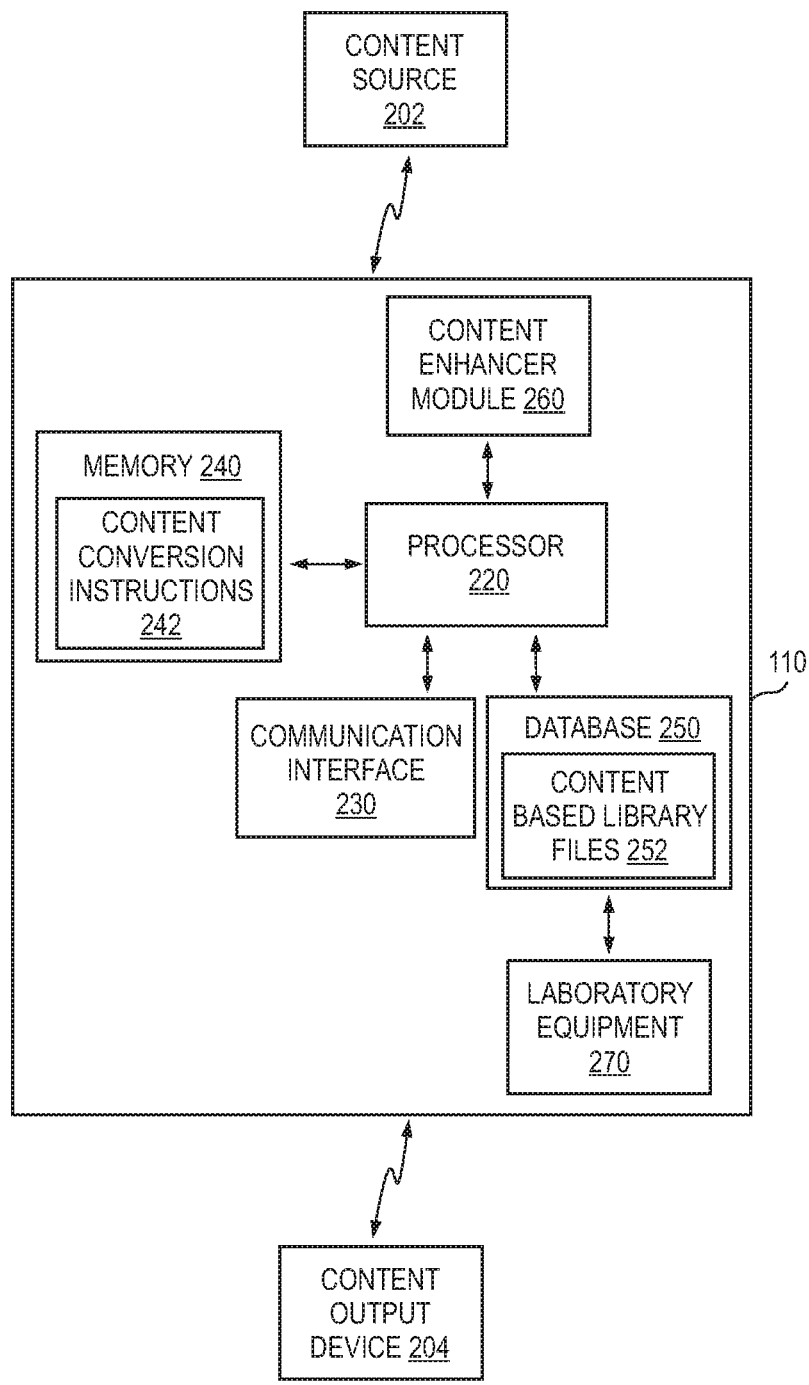
FIG. 2 illustrates a block diagram representation of a system for facilitating content conversion, in accordance with an example embodiment of the present disclosure.

FIG. 2 illustrates a block diagram representation of the system 110 for facilitating content conversion, in accordance with an example embodiment of the present disclosure. The system 110 is shown in communication with a content source 202 (such as the content source 102) and a content output device 204 (such as the content output device 104) over a communication network (such as the network 120 of FIG. 1). In one embodiment, the content source 202 and the content output device 204 may correspond to an electronic device corresponding to an end-user willing to receive output content for entertainment, social interactions or learning purposes.

In an example embodiment, the system 110 includes at least one processor 220, a memory 240, a database 250, a communication interface 230 and a content enhancer module 260 for facilitating content conversion. The processor 220 is operatively coupled with the memory 240, the database 250, the communication interface 230 and the content enhancer module 260. The system 110 may operate on a single server or may be distributed across multiple servers that may be in the same location or different locations.

The database 250 is any computer-operated hardware suitable for storing and/or retrieving data, such as, but not limited to, a plurality of content based library files 252 (hereinafter referred to as content based library files 252), a plurality of user preferences, a plurality of content characteristics, a plurality of input contents, a plurality of output contents and the like. The database 250 may include multiple storage units such as hard disks and/or solid-state disks in a redundant array of inexpensive disks (RAID) configuration. The database 250 may include a storage area network (SAN) and/or a network attached storage (NAS) system. In some alternate embodiments, the database 250 may also include magnetic storage devices (such as hard disk drives, floppy disks, magnetic tapes, etc.), optical magnetic storage devices (e.g., magneto-optical disks), semiconductor memories (such as mask ROM, PROM (programmable ROM), EPROM (erasable PROM), Phase-change memory, flash ROM, RAM (random access memory)), etc. The system 110 include one or more storage interfaces for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 220 with access to the database 250.

The processor 220 is capable of executing the stored machine executable instructions, hereinafter referred to as content conversion instructions 242 stored in the memory 240 of the system 110. The processor 220 is configured to perform the various operations. For example, the processor 220 may be configured to facilitate output content on the content output device 204 based on receiving user preferences from the user device and input content from the content source 202 via the communication interface 230. The processor 220 is further configured to utilize the content based library files 252 stored in the database 250 of the system 110 for facilitating the conversion of the input content into the output content. The processor 220 may include one or more algorithms such as, but not limited to, speech to text algorithm, text to speech algorithm, speech recognition algorithm, face recognition algorithm, natural language processing algorithms and the like to facilitate content conversion. The processor 220, in conjunction with the content enhancer module 260, is configured to facilitate signal conditioning and quality enhancement of the input content received from the content source 202 using the content based library files 252. In an embodiment, the content enhancer module 260 is a part of the processor 220.

In an embodiment, the processor 220 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The system 110 further includes a laboratory equipment 270 (hereinafter referred to as lab 270) to generate the library files 252. The lab 270 is user configurable for producing library files 252 with various degree of precision and accuracy. In one embodiment, the lab 270 is an artificial intelligent device supported by human intelligence through manual editing mode and is made up of digital and analog hardware. The lab 270 can be interfaced/connected with all input-output devices (e.g., the content source 202 and content output device 204) over wired or wireless network such as the network 120 of FIG. 1. Further the lab 270, can exist remotely outside the system 110 as per the need and depending upon cost, precision, accuracy desired, and any other human deciding factors.

The memory 240 may be configured to store the content conversion instructions 242 for the processor 220 to execute for facilitating content conversion. The memory 240 is a storage device embodied as one or more volatile memory devices, one or more non-volatile memory devices, and/or a combination of one or more volatile memory devices and non-volatile memory devices, for storing micro-contents information and instructions. The memory 240 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash ROM, RAM (random access memory), etc.).

The communication interface 230 is configured to facilitate communication between the system 110, the content source 202, the content output device 204 and the user device associated with user. In one embodiment, the communication interface 230 is configured to cause display of UIs on the content output device 204, thereby enabling the user to receive the output content. In one embodiment, the communication interface 230 includes a transceiver for wirelessly communicating information to, or receiving information from, the content source 202 or the content output device 204 or other suitable display device, and/or another type of remote processing device. In another embodiment, the communication interface 230 is capable of facilitating operative communication with the remote devices and a cloud server using API (Application Program Interface) calls. The communication may be achieved over a communication network (such as the network 120 of FIG. 1).

In at least some example embodiment, the system 110 may include an Input/Output interface (I/O interface) (not shown in FIG. 2) configured to receive inputs from and provide outputs to the user of the system 110. To that effect, the I/O interface may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a UI display (such as a light emitting diode display, a thin-film transistor (TFT) display, a liquid crystal display, an active-matrix organic light-emitting diode (AMOLED) display, etc.), a speaker, a ringer, a vibrator, and the like.

Figure 3:
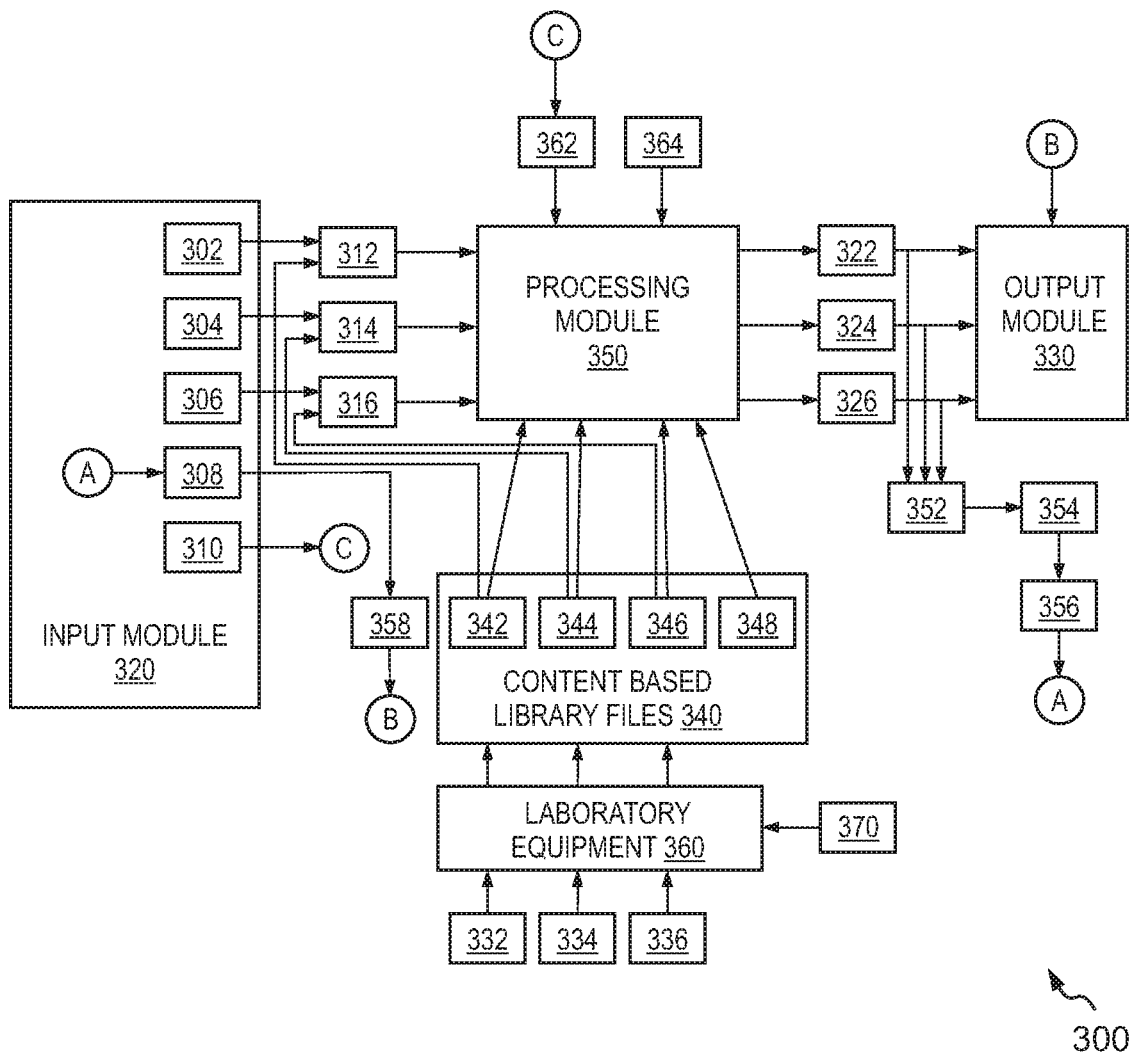
FIG. 3 shows a block diagram of a content converter device for facilitating content conversion, in accordance with an example embodiment of the present disclosure.

FIG. 3 shows a block diagram of a content converter device 300 (hereinafter referred to as device 300) for facilitating content conversion, in accordance with an example embodiment of the present disclosure. In at least one embodiment, the device 300 includes an input module 320, a processing module 350, a plurality of content based library files 340 (hereinafter alternatively referred to as library files 340) and an output module 330.

The input module 320 is configured to receive a user request (see, box 310) to facilitate output content based on one or more user preferences provided by a user. The input module 320 also includes one or more content sources (see, boxes 302, 304, 306 and 308) configured to provide input content based on the one or more user preferences. For example, an audio source 302 is configured to provide an audio input. A text source 304 is configured to provide a text input. A video source 306 is configured to provide a video input. A multimedia source 308 is configured to provide a multimedia input to the device 300. The input content can be a stored input content, a content that is captured in real time, or the content accessed or streamed from other locations. For example, a stored text input file (e.g., received from the text source 304) may be in a soft copy on a Computer Disc (CD), a Universal Serial Bus (USB) drive, or any other storage devices, or may be downloaded from the Internet and the like or a hard copy printed on a paper drawn/written by human being or machines, in any language. The input module 320 may include at least one input device. Examples of the input device may include, but are not limited to, a keyboard, a mouse, a joystick, a keypad, a touch screen, soft keys, a microphone, a camera, a scanner and the like.

In one embodiment, the library files 340 may correspond to content based library files 252 stored in the database 250 of the system 110 of FIG. 2. The library files 340 further include audio library files 342, text library files 344, video library files 346, and language conversion library files 348 stored in the device 300 for use by the processing module 350. In one embodiment, the audio library files 342 include one or more audio characteristics, text library files 344 include one or more text characteristics, video library files 346 include one or more video characteristics and the language conversion library files 348 include one or more language characteristics. Library files 340 are generated using a laboratory equipment 360 (hereinafter referred to as lab 360). Lab 360 may correspond to lab 270 of FIG. 2. In one embodiment, the lab 360 receives audio input in any format from an audio source 332 for defining the audio characteristics as per the user preferences to generate the audio library files 342. Similarly, lab 360 receives text input in any format from a text source 334 for defining the text characteristics as per the user preferences to generate the text library files 344. Further, lab 360 receives video input in any format from a video source 336 for defining the video characteristics as per the user preferences to generate the video library files 346 In one embodiment, the lab 360 may also include necessary files/sources for defining language conversion characteristics to generate language conversion library files 348 In some embodiments, the input content received from the content sources 302, 304 and 306 may be the input content received from the content sources 332, 334 and 336, respectively, by the lab 360 for generating the audio library files 342, text library files 344 and video library files 346.

In one embodiment, the lab 360 is configured to receive inputs from a manual editor 370. More specifically, the lab 360 is user configurable for producing library files 340 of various degree of precision and accuracy using the manual editor 370. In one embodiment, the lab 360 and the manual editor 370 can be remotely located in a server and be capable of producing desired library files 340.

In one embodiment, the language conversion library files 348 may be used by the processing module 350 (e.g., processor 220 of system 110) for converting audio input, text input and video input into a plurality of different languages as per user preferences. For example, one language can be converted to another language straight forward with grammar and vocabulary. Alternatively, one language can be converted to another language through a bridge language/intermediate language. Criteria for selection of intermediate language may include, for example, a superset of vocabulary and grammar of a plurality of different languages. For example, Chinese can be converted to an intermediate language English, which can be converted into other target languages such as Spanish or French. It is noted that there can be multiple intermediate languages between source and target languages and they can be user configurable as well.

In an embodiment, the library files 340 may be sophisticated as per daily usage of the device 300 by updating new input content on a periodic basis for later use. In addition to characterization, the library files 340 can be edited. The library files 340 can be put in a learning mode algorithm, which can learn and enhance library files 340 by learning from stored data or live data being received from various content sources (such as the content sources 332, 334 and 336). Further, the library files 340 may be improved/enhanced through algorithms that use best benchmarked data to improve/enhance the library files 340. It is noted that the library files 340 may or may not co-exist in the device 300 and may be received from various sources such as the remotely located lab 360 using a communication module 354 depending upon factors such as need, accuracy, sophistication and the like. In one embodiment, the library files 340 can go through algorithms of self-learning based on iterative minimization of error of actual output with respect to desired output through a feedback mechanism. The feedback mechanism may be machine based and/or human based (i.e., receiving feedback from users of the device 300).

The device 300 further includes a plurality of other modules such as an audio enhancer 312, a text enhancer 314, a video enhancer 316, an output combiner 352, the communication module 354, a content separator 358, a user configuration module 362, a manual modifier 364 and the like. In one embodiment, the audio enhancer 312, the text enhancer 314 and the video enhancer 316 may functionally correspond to the content enhancer module 260 of the system 110 of FIG. 2. In an example, the audio enhancer 312 is configured to receive the audio input from the audio source 302 the audio enhancer 312 is configured to provide signal conditioning and processing of the audio input in analog and digital formats and domains. In an example, the audio enhancer 312 also receives input from the audio library files 342, which contains the audio characteristics, to improve quality of the received audio input.

The text enhancer 314 is configured to receive text input from the text source 304. The text enhancer 314 also includes required hardware and/or software such as a reader for soft copy files and a scanner to read hardcopy files. Using text library files 344, the text enhancer 314 improves the quality and understanding of the text input received from the text source 304.

The video enhancer 316 is configured to receive video input from the video source 306. The video enhancer 316 is configured to provide signal conditioning and processing of the video input. The video enhancer 316 also receives input from the video library files 346 which contains the video characteristics to improve quality of the video input.

In one embodiment, the user may provide the user preferences using an input interface of the input module 320. The user preferences may be sent to the user configuration module 362 which is further configured to forward them to the processing module 350. Depending upon user preferences received from the user configuration module 362, the processing module 350 is configured to perform one or more actions. The processing module 350 receives input content from the audio enhancer 312, text enhancer 314 and the video enhancer 316. The processing module 350 is further configured to receive inputs in terms of one or more relevant content characteristics from the audio library files 342, the text library files 344, the video library files 346 and the language conversion library files 348 generated by the lab 360. The processing module 350 is configured to generate the output content from the input content utilizing the content characteristics accessed from the library files 340.

In one embodiment, the processing module 350 is configured to execute one or more algorithms such as, but not limited to, text to speechalgorithm, speech to textalgorithm, language conversionalgorithm, facial recognitionalgorithm, voice recognitionalgorithm and the like. Further, the processing module 350 is configured to receive either audio input, text input, video input or a combination thereof, and it has capability to produce an audio output 322, a text output 324 and a video output 326. Further, the output content (e.g., the audio output 322, the text output 324 and the video output 326) can be generated in any language using the language conversion library files 348. The output module 330 is configured to facilitate the generated output content. The output module 330 includes at least one output interface. Examples of the output interface may include, but are not limited to, a User Interface (UI) such as a UI display (such as a light emitting diode display, a thin-film transistor (TFT) display, a liquid crystal display, an active-matrix organic light-emitting diode (AMOLED) display, etc.), a speaker, a ringer, a vibrator, and the like. In some embodiments, the output module 330 may facilitate an augmented reality or heads-up display where a projected image or graphic is superimposed over a real-world view as perceived by the user through the output interface. In other embodiments, the output module 330 may also include an output screen which may raise characters of a document from the screen for touch and feel of the characters for visually impaired people.

It is understood that all the interfaces of the device 300 can be built into the device 300 or can be attached to the device 300 via wired or wireless connections. This allows the device 300 and the interfaces to be remotely located. For example, camera, microphone, display screen, speaker etc., and the device 300 can be used in a client server mode as explained with reference to the system 110 of FIG. 2.

In an embodiment, the output combiner 352 is configured to combine the audio output 322, text output 324 and the video output 326 generated by the processing module 350. The output combiner 352 is further configured to convert the output content in a proprietary format. This proprietary format may have associated abilities/utilities to convert back and forth from the commercially available formats e.g., Microsoft word and the like. The combined output format may use a storage efficient compression algorithm (for example, a zip file) while storing the content in the memory of the device 300 before sending it to the output module 330 or to a remote device such as the remote device 356. The remote device 356 may be any electronic device with communication capabilities including the user device associated with the user.

The communication module 354 may include mechanisms configured to receive inputs from and provide outputs to the remote device 356. The communication module 354 may include a transceiver for wirelessly communicating information to, or receiving information from, the remote device 356. In one embodiment, the remote device 356 may be a content output device (e.g., the content output device 204 of FIG. 2 or the content output device 104 of FIG. 1). In other embodiments, the remote device 356 may be an example of a server system such as the system 110 of FIG. 1 which is capable of processing the input content to generate the output content and facilitate the output content on the output module 330 of the device 300. For example, the communication module 354 may send an audio-visual input from an in-built camera to the system 110 to generate output content as requested by the user on the output module 330.

In one embodiment, the input module 320 of the device 300 is configured to receive multimedia input from the multimedia source 308 in order to generate the multimedia output or separate output files based on user preferences received from the user configuration module 362. In one embodiment, the multimedia input may be received from the remote device 356. In other embodiments, the multimedia input may be the output content generated by the output combiner 352 and received by the remote device 356 via the communication module 354.

In one embodiment, the content separator 358 is capable of separating the multimedia input received from the multimedia source 308 and then facilitate it on the output module 330. In one embodiment, the audio, video and text input may be separated from each other (i.e., the multimedia input) using delimiters between each of them. Each of audio/video/text inputs and the library files 340 may use its own storage algorithm which may further be mentioned in respective information header of each input/file. For example, each of them may have two separate storage locations identified by specific names such as information section and data section. The information section may provide information about the data section. In one embodiment, there may also be present the manual modifier 364 that provides the facility to manually edit the audio, text and video at various stages while being processed by the processing module 350 to generate the output content. It is understood that the device 300 or the system 110 are configured to obtain authorization from a plurality of entities in order to generate the output content. For example, if a celebrity voice is to be used as an input content, corresponding authorization from the celebrity needs to be obtained before using his/her voice.

In one example embodiment, the device 300 is configured to process audio input received from one or more audio sources (e.g., the audio source 302 being an in-built microphone of the device 300). The audio input can be synthesized using the device 300 or substituted by the device 300. The device 300 is capable of facilitating substitution of songs, musical performances (stored or captured in real time), musical instruments used in those performances, animal sounds and the like using the audio characteristics accessed from the audio library files 342. For example, identifying and substituting musical instrument in a song i.e., Indian instrument 'Tabla' being substituted by 'Drum' sound in a song. The audio library files 342 may already have sounds of various musical instruments stored therein to facilitate such substitution. As another example, the processing module 350 may utilize speech to text algorithm, the language conversion library files 340, and text to speech algorithm in sequence to produce original speech/song in multiple languages as per user preferences. Further, the audio library files 342 may also be configured to generate a new song or speech using stored audio characteristics. It is noted that the audio characteristics may be recorded as time domain (such as amplitude, speed, direction of sound etc.) and frequency domain (such as fundamental frequency and harmonic frequency contents of audio input or amplitude of these fundamental and harmonic frequencies) characteristics in various embodiments.

In another example embodiment, the audio characteristics may also be used for sound quality enhancement in communication systems that distort original transmitted sound due to noise in transmission media. At the receiving end of transmission line of communication system, by identifying sound with respect to stored sound, quality of distorted received sound can be enhanced/improved or selectively substituted for better audio quality by the processing module 350. This feature may further be applied to audio files stored on various media devices that get corrupted or distorted due to various reasons such as aging, degradation of material used for storing, and the like to provide quality enhancement. Additionally, enhancement in audio quality may involve audio to text conversion and then from the converted text back to audio conversion.

In one example embodiment, the input module 320 may be configured to include a writing pad (screen) with a stylus (e.g., the text source 304) for enabling the user to write/draw using stylus to provide text input to the device 300 in a handwritten/drawn format. The text library files 344 may be configured to determine text characteristics that may be used by the processing module 350 to enhance/convert the text input being written/drawn to a text output or other form of the output as per user preferences. For example, pressure with which user writes with stylus/pen on the writing pad, speed of writing/drawing, color selection to write/draw, other activities performed using the pad and the like may be used by the processing module 350 to analyze and determine various features of the text input.

For example, for a written document, using the characteristics such as pressure, speed of writing, content of writing and style of writing, the processing module 350 may be configured to analyze human nature and may further be able to associate with voice of the user. In an example scenario, if the written document is to be converted to an audio form in a specified language in the voice of the user who is writing the document, and if the audio library files 342 already include the user's voice, the processing module 350 may fetch the relevant file and produce the desired output. In various embodiments, a keyboard input using mechanical keys or touch screen, various types of page scanners or character scanners, images of the document captured by the camera, etc., may also be detected by the device 300 to determine various characteristics of the document. The output content generated using the document with all the information can be stored inside the device 300 or can be sent to the remote device 356 connected to the device 300 via wired or wireless connections (such as a printer to produce a printed copy of the text output).

In one example embodiment, the video source 306 may be capable of providing any form of video input stored or captured in real time. Some non-exhaustive examples of the video source 306 include cameras such as Digital Single-Lens Reflex (DSLR), camcorder, movie cameras and the like. In one embodiment, audio associated with video input may be handled by the audio enhancer 312 and processed by the processing module 350 using the audio characteristics as explained hereinabove. The video library files 346 are configured to provide the video characteristics such as identifying various parts of the human body by monitoring leg movement, facial expression, hand movement, steps size, sitting posture, angle, speed of walking and the like. For a real time, scenario, a user can himself/herself characterize different physical expressions and the same can be processed by the processing module 350 to generate the desired output content. In one embodiment, the camera of the device 300 may be configured to listen to audio, record video, capture images or other interactions that are within field of view to identify people, objects and other relevant content. This may be sent to the video library files 346 to further characterize various non-living aspects of the video input such as river, mountains and the like. This characterized data can be used by the processing module 350 to generate a different video output (movie scene) using only a portion of the original content.

Figure 4:
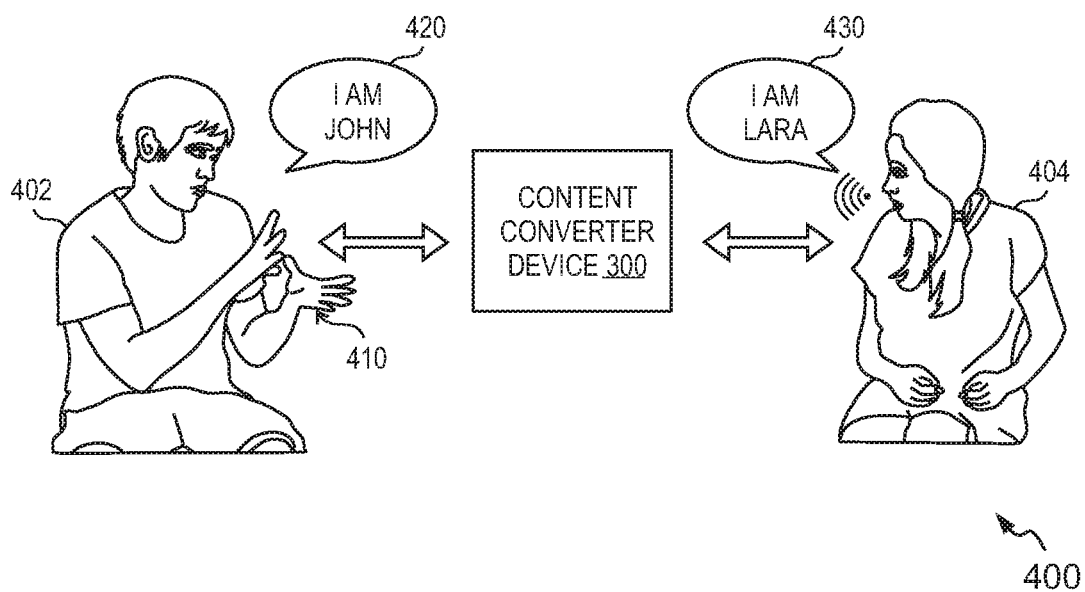
FIG. 4 shows a simplified representation of the content converter device of FIG. 3 for facilitating content conversion in an example scenario, in accordance with an example embodiment of the present disclosure.

FIG. 4 shows a simplified representation 400 of the content converter device 300 of FIG. 3 for facilitating content conversion in an example scenario, in accordance with an example embodiment of the present disclosure. The representation 400 includes an example scenario, where a user 402 is a hearing-impaired person and is using signs 410 (e.g., hand movements) to communicate with another user 404. The user 404 can speak and hear completely, but does not understand interpretation of sign language. The user 402 is shown to convey a message 420 (exemplarily depicted as 'I am John') using the signs 410. The content converter device 300 is shown being used by the users 402 and 404. In one embodiment, the device 300 can be trained to include and interpret the sign languages. Further, the device 300 may have the capability to see the user 402 using an in-built camera (or connected to the device 300 by wired or wireless connection) to capture video of the user 402 performing the sign language 410. This video input may be improved by the video enhancer 316 and thereafter may be sent to the processing module 350 for converting it into an audio output in a preferred language as provided by the user 404 to understand the message 420 being conveyed by the user 402.

The processing module 350 may utilize video characteristics and language conversion characteristics stored in respective library files (as generated by the lab 360) to interpret and convert the signs 410 into the audio output. The audio output may be provisioned by in-built speakers, or headphones (not shown) being used by the user 404. Further, the user 404 may use a microphone of the device 300 to convey a responding message 430 (exemplarily depicted as 'I am Lara') to convey it to the user 402. The audio input received by the audio enhancer 312 may be conditioned and sent to the processing module 350 for further processing. The processing module 350 may utilize the audio characteristics and the language conversion characteristics from the respective library files to convert the speech/audio input of the user 404 into a corresponding sign language. The converted sign language may be displayed on a display screen of the device 300 for the user 402 to see and interpret the message 430 conveyed by the user 404. In one example embodiment, the device 300 may be configured to show the converted sign language by means of a sequence of still images of sign language or by means of a video of a person performing the sign language on the display screen of the output module 330.

Figure 5:
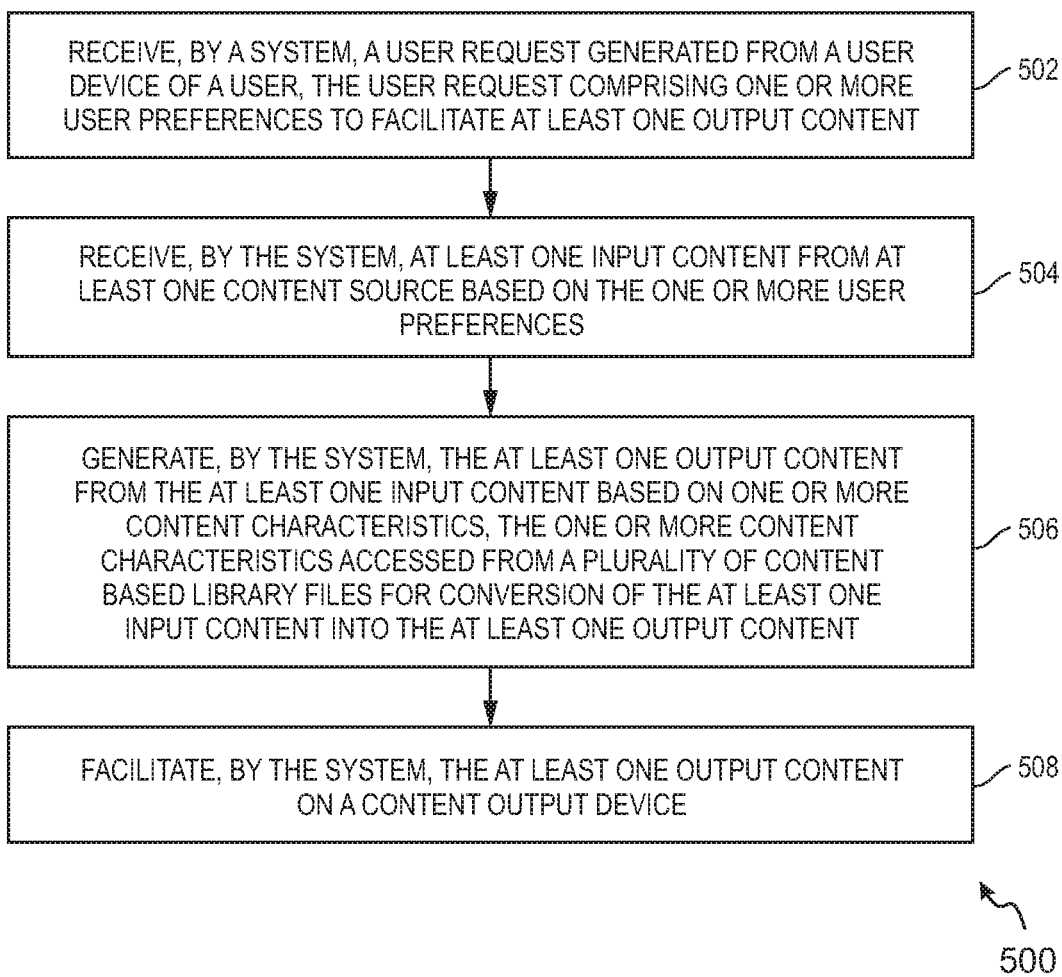
FIG. 5 is a flow diagram of a method for facilitating content conversion, in accordance with an example embodiment of the present disclosure.

FIG. 5 is a flow diagram of a method 500 for facilitating content conversion, in accordance with an example embodiment of the present disclosure. The various steps and/or operations of the flow diagram, and combinations of steps/operations in the flow diagram, may be implemented by, for example, hardware, firmware, a processor, circuitry and/or by the system 110 of FIG. 1, and/or by the content converter device 300 of FIG. 3 and/or by a different electronic device associated with the execution of software that includes one or more computer program instructions.

At 502, a user request generated from a user device of a user is received by the system 110 of FIG. 1. The user request includes one or more user preferences to facilitate at least one output content based on the one or more user preferences. For example, the user may wish to have a written document converted to a song in his/her preferred language with music associated with it. In one embodiment, the user preferences may further include level of accuracy desired in the output content, format of output content, enabling bridge language conversion while document conversion from one language to another language, preferences related to bridge languages to be used, the content output device on which the output content is desired to be received, and the like.

At 504, at least one input content is received from at least one content source based on the one or more user preferences. The system or the content converter device is configured to receive audio input, text input, video input or multimedia input from the respective content sources. In one embodiment, the input content may be conditioned in terms of quality improvement by at least one content enhancer module such as the audio enhancer 312, the text enhancer 314 and the video enhancer 316 of FIG. 3 before generating the output content as per the user preferences.

At 506, the at least one output content is generated from the at least one input content based on one or more content characteristics. The one or more content characteristics are accessed from a plurality of content based library files for conversion of the at least one input content into the at least one output content. In one embodiment, the content characteristics are stored as digitized data organized as object of a class into each library file. The library files are generated by a laboratory equipment (such as lab 130/lab 270/lab 360).

At 508, at least one output content is facilitated on a content output device. For example, the system can generate speech or video of any person living or dead (such as Michael Jackson performing/singing a new song) using one or more content characteristics stored in the plurality of content based library files such as the library files 252 stored in the database 250 of the system 110. Further, the system can generate document/text output automatically in a courtroom, where a courtroom assistant is continuously needed to type/write down everything being spoken. In an example embodiment, existing printers, scanners and copier machines may be provided with an add-on device such as the content converter device 300 for extending limited capabilities of the existing machines to the next enhanced levels. In one embodiment, a media workshop containing audio workshop, document workshop and video workshop can be realized using the system's editing module (e.g., using one or more UIs) with software integrated development environment (Similar to commercially available Photoshop software used for picture enhancement).

The disclosed method 500 or one or more operations of the method 500 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Various example embodiments offer, among other benefits, techniques for establishing system, device and method for facilitating content conversion and thereby enhancing user experience, increasing social interactions and learning capabilities of the users. For example, using various features of the system, a world knowledge library or a creativity center may be built. Such library may include accommodation centers and learning centers to gain knowledge from ancient time to modern time irrespective of the teachers and the audience being from different cultures and knowing different languages. Thereby, using technology of the present disclosure, people from different regions can meet and communicate with each other irrespective of languages known, in verbal and/or written form. Further, the content converter device can be used in movie theatres and auditoriums for listening to the live audio in the preferred language of the user.

Moreover, for legal investigations, people generally describe a person's facial features verbally and an artist draws the picture of that person as per the description. Such conventional process is a time-consuming process. Moreover, if the description and the drawn picture do not match, the whole process needs to be repeated. Instead, the content converter device provided in present disclosure may be trained and used for converting the verbal description of a person into a picture of that person with enhanced accuracies and a faster approach. Furthermore, the system can be trained with language of reading by touch and feel such that, using the system, a visually impaired person can read any book written in any language in his own language of touch and feel.

Although the disclosure has been described with reference to specific exemplary embodiments, it is noted that various modifications and changes may be made to these embodiments without departing from the broad spirit and scope of the disclosure. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the systems and methods may be embodied using transistors, logic gates, and electrical circuits (for example, application specific integrated circuit (ASIC) circuitry and/or in Digital Signal Processor (DSP) circuitry).

Particularly, the system 110 and its various components may be enabled using software and/or using transistors, logic gates, and electrical circuits (for example, integrated circuit circuitry such as ASIC circuitry). Various embodiments of the disclosure may include one or more computer programs stored or otherwise embodied on a computer-readable medium, wherein the computer programs are configured to cause a processor or computer to perform one or more operations (for example, operations explained herein with reference to FIG. 5). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the disclosure, as discussed above, may be practiced with steps and/or operations in a different order, and/or with hardware elements in configurations, which are different than those which, are disclosed. Therefore, although the disclosure has been described based upon these exemplary embodiments, it is noted that certain modifications, variations, and alternative constructions may be apparent and well within the spirit and scope of the disclosure. Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method, comprising:
   receiving, by a system, a user request generated from a user device of a user, the user request comprising a plurality of user preferences to facilitate at least one output content, wherein the plurality of user preferences includes: a level of accuracy desired in the output content, a format of output content, enabling bridge language conversion while inter-conversion of document to document, document to speech, speech to document, speech to speech from one language to another language, preferences related to bridge languages to be used, and the content output device on which the output content is desired to be received;
   receiving, by the system, at least one multimedia input content from at least one content source based on the plurality of user preferences;
   separating, by the system, the at least one multimedia input content from the at least one content source into audio input, text input, and video input using delimiters;
   facilitating quality improvement of the at least one multimedia input content, the quality improvement facilitated by at least one content enhancer module based on the one or more content characteristics accessed from a plurality of content based library files, enhancer module and artificial intelligent algorithms, wherein facilitating quality improvement comprises:
      conversion of a format of the at least one multimedia input content to another format and reconversion of the other format to the format of the at least one multimedia input content,
      substituting the at least one multimedia input content with new artificially generated content using a library file, the at least one content enhancer module, and the artificial intelligent algorithms, and wherein the conversion to the other format and the reconversion mechanisms are performed based on the plurality of user preferences;
   generating, by the system, the at least one output content from the at least one multimedia input content based on one or more content characteristics, the one or more content characteristics accessed from the plurality of content based library files for conversion of the at least one multimedia input content into the at least one output content, wherein the one or more content characteristics are audio characteristics, text characteristics, video characteristics, and language characteristics stored and accessed from content-based library files and the content-based library files are generated by a laboratory equipment; and
   facilitating, by the system, the at least one output content on a content output device and selectively substitute, by the system, the received output content for a better quality output content.

2. A system, comprising:
   a communication interface configured to:
      receive a user request generated from a user device of a user, the user request comprising a plurality of user preferences to facilitate at least one output content, wherein the plurality of user preferences includes: a level of accuracy desired in the output content, a format of output content, enabling bridge language conversion while inter-conversion of document to document, document to speech, speech to document, speech to speech from one language to another language, preferences related to bridge languages to be used, and the content output device on which the output content is desired to be received; and receive at least one multimedia input content from at least one content source based on the plurality of user preferences; and a processor in operative communication with the communication interface, the processor configured to:
separate the at least one multimedia input from the at least one content source into audio input, text input, video input using delimiters;
facilitate quality improvement of the at least one multimedia input content, the quality improvement facilitated by at least one content enhancer module based on the one or more content characteristics accessed from a plurality of content based library files, wherein facilitation of the quality improvement comprises:
conversion of a format of the at least one multimedia input content to another format and reconversion of the other format to the format of the at least one multimedia input content,
substituting the at least one multimedia input content with new artificially generated content using a library file, the at least one content enhancer module, and the artificial intelligent algorithms, and wherein the conversion to the other format and the reconversion mechanisms are performed based on the plurality of user preferences;
generate the at least one output content from the at least one multimedia input content based on one or more content characteristics, the one or more content characteristics accessed from the plurality of content based library files for conversion of the at least one multimedia input content into the at least one output content, wherein the one or more content characteristics are audio characteristics, text characteristics, video characteristics, and language characteristics stored and accessed from content-based library files and the content-based library files are generated by a laboratory equipment; and
facilitate the at least one output content on a content output device via the communication interface and selectively substitute, by the system, the received output content for a better quality output content.

3. A content converter device, comprising:
an input module configured to receive a user request comprising a plurality of user preferences to facilitate at least one output content, wherein the plurality of user preferences includes: a level of accuracy desired in the output content, a format of output content, enabling bridge language conversion while inter-conversion of document to document, document to speech, speech to document, speech to speech from one language to another language, preferences related to bridge languages to be used, and the content output device on which the output content is desired to be received;
at least one content source configured to provide at least one multimedia input content based on the plurality of user preferences;
a processing module configured to:
separate the at least one multimedia input from the at least one content source into audio input, text input, video input using delimiters;
facilitate quality improvement of the at least one multimedia input content, the quality improvement facilitated by at least one content enhancer module based on the one or more content characteristics accessed from a plurality of content based library files, wherein facilitation of the quality improvement comprises:
conversion of a format of the at least one multimedia input content to another format and reconversion of the other format to the format of the at least one multimedia input content, and
substituting the at least one multimedia input content with new artificially generated content using a library file, the at least one content enhancer module, and the artificial intelligent algorithms, and wherein the conversion to the other format and the reconversion mechanisms are performed based on the plurality of user preferences; and
generate the at least one output content from the at least one multimedia input content based on one or more content characteristics, the one or more content characteristics accessed from the plurality of content based library files for conversion of the at least one multimedia input content into the at least one output content, wherein the one or more content characteristics are audio characteristics, text characteristics, video characteristics and language characteristics stored and accessed from content-based library files and the content-based library files are generated by a laboratory equipment; and
an output module configured to facilitate the at least one output content and selectively substitute, by the system, the received output content for a better quality output content.

4. The method of claim 1, wherein the at least one output content is at least one of: an audio output, a text output, a video output and a multimedia output.

5. The method of claim 1, wherein the plurality of content based library files are generated from a laboratory equipment.

6. The method of claim 1, wherein at least one content based library file from among the plurality of content based library files corresponds to at least one of: audio library files, text library files, video library files and language conversion library files.

7. The method of claim 1, further comprising:
combining one or more output contents from among the at least one output content based on the plurality of user preferences, and
combining of the one or more output contents facilitated by an output combiner module.

8. The computer-implemented method of claim 1, wherein the at least one multimedia input content comprises a video of the user performing sign language, the method further comprising converting, by the system, the at least one multimedia input content into one of audio output, video output, text output, and multimedia output using bridge language conversion.

9. The computer-implemented method of claim 1, wherein the at least one multimedia input content comprises one of: an audio input, a video input, a text input, and a multimedia input, the method further comprising converting, by the system, the at least one multimedia input content into a video of a person performing sign language.

10. The system of claim 2, wherein the at least one output content is at least one of: an audio output, a text output, a video output and a multimedia output.

11. The system of claim 2, further comprising a laboratory equipment for generating the plurality of content based library files based on inputs from the at least one content source.

12. The system of claim 2, wherein at least one content based library file from among the plurality of content based library files corresponds to at least one of audio library files, text library files, video library files and language conversion library files.

13. The content converter device of claim 3, further comprising:
a communication module configured to send the at least one output content to a system, the system configured to facilitate the at least one output content on the output module.

14. The method of claim 6, wherein the audio library files comprise one or more audio characteristics.

15. The method of claim 6, wherein the video library files comprise one or more video characteristics.

16. The method of claim 6, wherein the text library files comprise one or more text characteristics.

17. The method of claim 6, wherein the language conversion library files comprise one or more language conversion characteristics.

18. The system of claim 11, wherein the laboratory equipment is an artificial intelligent device made up of digital and analog hardware, doing processing in digital and analog domain with or without human as needed.

19. The system of claim 12, wherein the audio library files comprise one or more audio characteristics.

20. The system of claim 12, wherein the video library files comprise one or more video characteristics.

21. The system of claim 12, wherein the text library files comprise one or more text characteristics.

22. The system of claim 12, wherein the language conversion library files comprise one or more language conversion characteristics.

* * * * *